United States Patent
Hallett

(10) Patent No.: US 9,443,311 B2
(45) Date of Patent: Sep. 13, 2016

(54) METHOD AND SYSTEM TO IDENTIFY A POSITION OF A MEASUREMENT POLE

(71) Applicant: Topcon Positioning Systems, Inc., Livermore, CA (US)

(72) Inventor: Jason Hallett, Livermore, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 20 days.

(21) Appl. No.: 14/303,219

(22) Filed: Jun. 12, 2014

(65) Prior Publication Data

US 2015/0363936 A1 Dec. 17, 2015

(51) Int. Cl.
G06K 9/00 (2006.01)
G06T 7/00 (2006.01)
G01C 15/06 (2006.01)
G06F 3/03 (2006.01)

(52) U.S. Cl.
CPC ............ *G06T 7/0057* (2013.01); *G01C 15/06* (2013.01); *G06F 3/0325* (2013.01); *G06T 2207/10004* (2013.01); *G06T 2207/10028* (2013.01); *G06T 2207/30204* (2013.01)

(58) Field of Classification Search
USPC ................................................. 382/106, 154
See application file for complete search history.

(56) References Cited

U.S. PATENT DOCUMENTS

| | | |
|---|---|---|
| 4,893,922 A | 1/1990 | Eichweber |
| 5,204,731 A | 4/1993 | Tanaka et al. |
| 5,297,061 A | 3/1994 | Dementhon et al. |
| 5,771,099 A | 6/1998 | Ehbets |
| 5,818,424 A | 10/1998 | Korth |
| 5,867,273 A | 2/1999 | Corby, Jr. |
| 5,995,650 A * | 11/1999 | Migdal ............... G01B 11/2518 345/419 |
| 6,072,903 A * | 6/2000 | Maki ..................... G06T 7/2033 348/169 |
| 6,611,141 B1 | 8/2003 | Schulz et al. |
| 6,675,122 B1 | 1/2004 | Markendorf et al. |
| 6,724,930 B1 * | 4/2004 | Kosaka ................ G01B 11/002 382/154 |
| 7,728,963 B2 | 6/2010 | Kirschner |
| 7,913,405 B2 | 3/2011 | Berg et al. |
| 8,212,993 B2 | 7/2012 | Prams et al. |
| 8,331,624 B2 | 12/2012 | Braunecker et al. |

(Continued)

OTHER PUBLICATIONS

Berntsen.com; "Reflective Tape Targets/Reflective Survey Targets"; downloaded from http://www.berntsen.com/Surveying/Smart-Targets-Datums-Reflectors/Reflective-Tape_Targets on Nov. 21, 2013; pp. 1-6.

(Continued)

*Primary Examiner* — Alex Liew
(74) *Attorney, Agent, or Firm* — Chiesa Shahinian & Giantomasi PC

(57) ABSTRACT

A method and a system in which an image of an object having a tip end and a plurality of markings disposed on an outer surface is acquired, a distance between the measurement system and each of the plurality of markings and a plurality of angles at which the object is positioned in the three-dimensional space are determined, a three-dimensional vector of the object is determined based on the distance between the measurement system and each of the plurality of markings and based on the plurality of angles at which the object is positioned in the three-dimensional space, and a position of the tip end in the three-dimensional space is determined based on the distance to each of the plurality of markings and based on the three-dimensional vector of the object.

20 Claims, 3 Drawing Sheets

(56) References Cited

U.S. PATENT DOCUMENTS

| | | |
|---|---|---|
| 8,510,964 B2 | 8/2013 | Nagao |
| 8,567,076 B2 | 10/2013 | Ortleb et al. |
| 2005/0026689 A1 | 2/2005 | Marks |
| 2007/0182725 A1 | 8/2007 | Pittel |
| 2012/0188529 A1 | 7/2012 | France |
| 2013/0050474 A1 | 2/2013 | Metzler |
| 2013/0162469 A1 | 6/2013 | Zogg et al. |

OTHER PUBLICATIONS

International Search Report and Written Opinion mailed on Aug. 20, 2015, in connection with International Patent Application No. PCT/US2015/033323, 15 pgs.

* cited by examiner

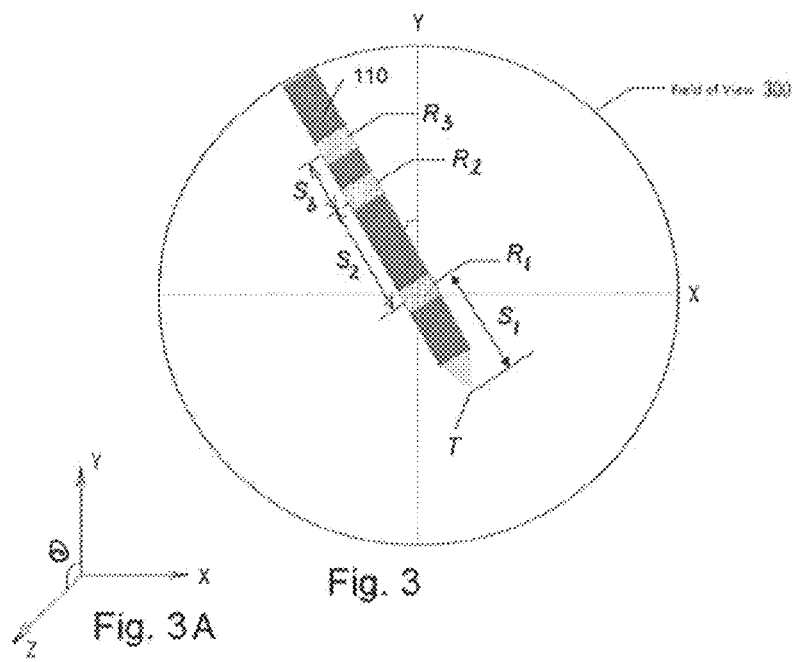
Fig. 3
Fig. 3A
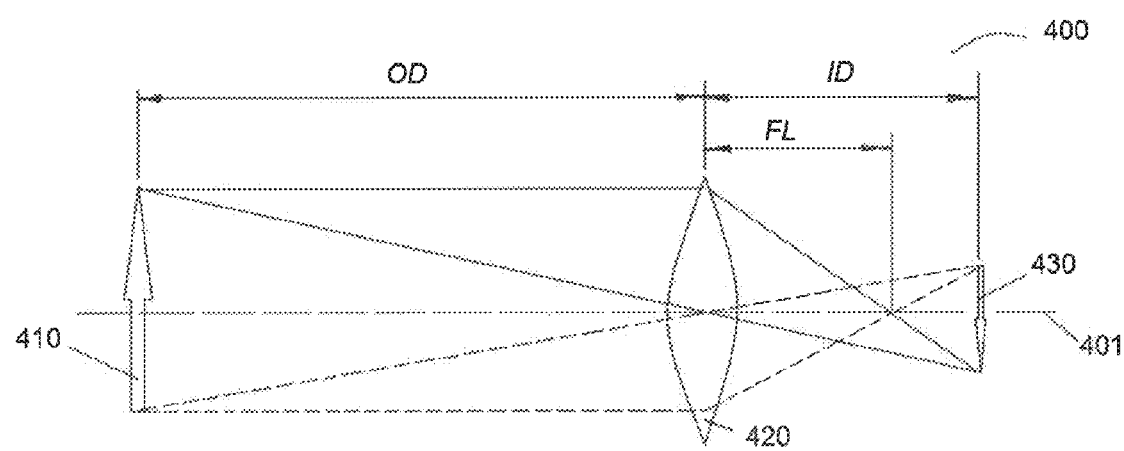
Fig. 4

METHOD AND SYSTEM TO IDENTIFY A POSITION OF A MEASUREMENT POLE

BACKGROUND

The present disclosure relates to a measurement system for determining a position of an object or a portion of the object, and to a corresponding measurement method.

The determination of a location of an object, its position, velocity, vector, etc., is normally very costly as it requires complex and expensive equipment. It is especially true in the case of moving objects as it is difficult or even impossible to determine a position of an object or a position of a portion of the object if the object is in motion.

BRIEF SUMMARY OF THE INVENTION

The present disclosure relates to providing a measurement system and measurement method with which a determination of a location of a tip of an object can be undertaken accurately, rapidly, and with a very high degree of automation. In one embodiment, the measurement method is directed to receiving an image of an object. The object is a rod which has a tip end and a plurality of markings disposed on an outer surface of the object. In an embodiment, the markings are photo-reflectors (e.g., reflective tape), optical signal emitters, or a combination thereof. A distance between the tip end and at least one of the plurality of markings and a distance between each of the plurality of markings are known.

Upon receiving the image of the object, a distance between the measurement system and each of the plurality of markings is determined. The measurement method is also directed to determining a three-dimensional vector of the object. A process of determining the three-dimensional vector of the object includes determining a yaw angle at which the object is positioned in the three-dimensional space and determining a pitch angle at which the object is positioned in the three-dimensional space.

The method is further directed to determining a position of the tip end in the three-dimensional space based on the determined distance to each of the plurality of markings and based on the determined three-dimensional vector of the object in the three-dimensional space. The method is also directed to transmitting the image of the object to a remote device and displaying to a user the position of the tip end of the object, the distance to each of the plurality of markings, and the three-dimensional vector of the object.

These and other advantages of the invention will be apparent to those of ordinary skill in the art by reference to the following detailed description and the accompanying drawings.

BRIEF DESCRIPTION OF THE DRAWINGS

FIGS. 3 and 3A illustrate an image of an object in a field of view of a measurement system according to an embodiment;

FIG. 4 illustrates generation of an image of object 110 by measurement system 100 according to an embodiment;

DETAILED DESCRIPTION

Figure 1:
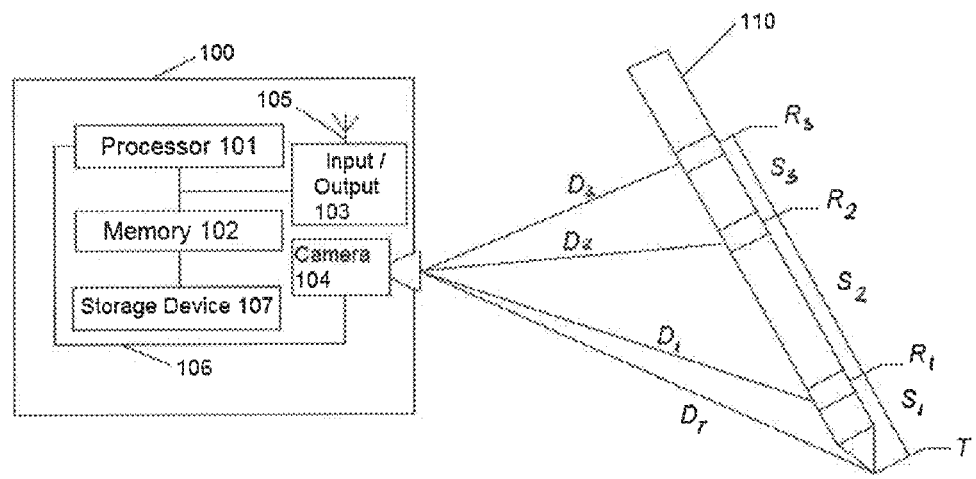
FIG. 1 illustrates a schematic representation of a measurement system in use according to an embodiment.

FIG. 1 illustrates a schematic representation of a measurement system 100 to determine a position of tip T of object 110 according to an embodiment. Specifically, FIG. 1 illustrates a measurement system 100 which includes a processor 101, a memory 102, an input-output module 103, a camera 104, antenna 105, electrical/electronic circuitry 106, and storage device 107.

Processor 101 may be any suitable processor, computing module, data processing device, or combination of the same. Processor 101 is communicatively coupled with memory 102 and with a storage device 107 for storing computer-readable program instructions that provide the governing logic for controlling processor 101 to execute computer-readable program instructions stored in storage device 107 or other computer readable medium to determine a position of tip T of object 110 by tracking movement of one or more prisms, determining horizontal angles around the vertical axis and vertical angles at which object 110 is positioned in three-dimensional coordinate plane.

Processor 101 may include both general and special purpose microprocessors, and may be the sole processor or one of multiple processors of measurement system 100. Processor 101 may comprise one or more central processing units (CPUs), for example. Processor 101 and memory 102 may include, be supplemented by, or incorporated in, one or more application-specific integrated circuits (ASICs) and/or one or more field programmable gate arrays (FPGAs).

Storage device 107 and memory 102 each comprise a tangible non-transitory computer readable storage medium. Data storage device 107 and memory 102, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input-Output module 103 is a module which includes input means, such as a keypad, touchscreen, haptic controls, voice-recognition means and the like, used to identify user command input, for example to direct camera 104 toward object 110 and to request determination of a distance to object 110, calculation of angles at which object 110 is positioned in a three-dimensional coordinate plane, and determination of a position of object 110 or a portion thereof (e.g., tip T of object 110). Input-Output module 103 also includes an output means, such as a display or a monitor to output images of object 110, indicate an input command from a user, and display results of calculation of distance to each marking on object 110, including a position of a tip of object 110 based on calculation of distances to each marking of object 110.

Camera 104 can be a video camera. In an embodiment, camera 104 is a matrix Charge-Coupled Device (CCD)

camera which provides a direct access of processor 101 to an acquired image of object 110. In an embodiment, camera 104 is configured to capture images of the markings of object 110 and identify a center of object 110 for tracking a measuring. A method of operation of CCD cameras is well known in the art and therefore is not described herein.

It is to be understood that design of measurement system 100 as described above is presented for purposes of illustration and not of limitation and that the invention described herein can be practiced by other than the described embodiments of measurement system 100. For example, measurement system 100 may include data transmitting means, such as antenna 105 to transmit received images of object 110 to a remote storage device or to a remote processor (not shown in FIG. 1) in order to carry out determination of a position of object 110 or a portion thereof in a three-dimensional coordinate plane and to display the determined position of object 110 in a remote output means.

Measurement system 100 may also include a power source (not shown) to supply power to measurement system 100. It is to be understood that measurement system 100 also includes electronic and electrical circuitry 106 to enable communicative connectivity between the elements of measurement system 100 and to synchronize the line-scanning frequency or image-scanning frequency of camera 104 (i.e., CCD camera).

In an embodiment, object 110 is a pole which terminates at one end with a tip T and which has at least three markings $R_1$, $R_2$, $R_3$ disposed on a surface at known spacing, i.e., a distance between tip T and each marking $R_1$, $R_2$, and $R_3$ is known. For example, distance between tip T and marking $R_1$ is distance $S_1$, distance between marking $R_1$ and marking $R_2$ is distance $S_2$, distance between marking $R_2$ and marking $R_3$ is distance $S_3$. In an embodiment, distance between tip T and marking $R_2$ equals a sum of distance $S_1$ and distance $S_2$. Distance between tip T and marking $R_3$ equals a sum of distance $S_1$, distance $S_2$, and distance $S_2$.

In an embodiment, each marking is a reflector which is capable of reflecting back an optical signal, with a low degree of scatter, substantially in the direction from which it comes. In other embodiments, each marking is an optical signal emitting element capable of emitting an optical signal, with a low degree of scatter, substantially in any direction.

Figure 2:
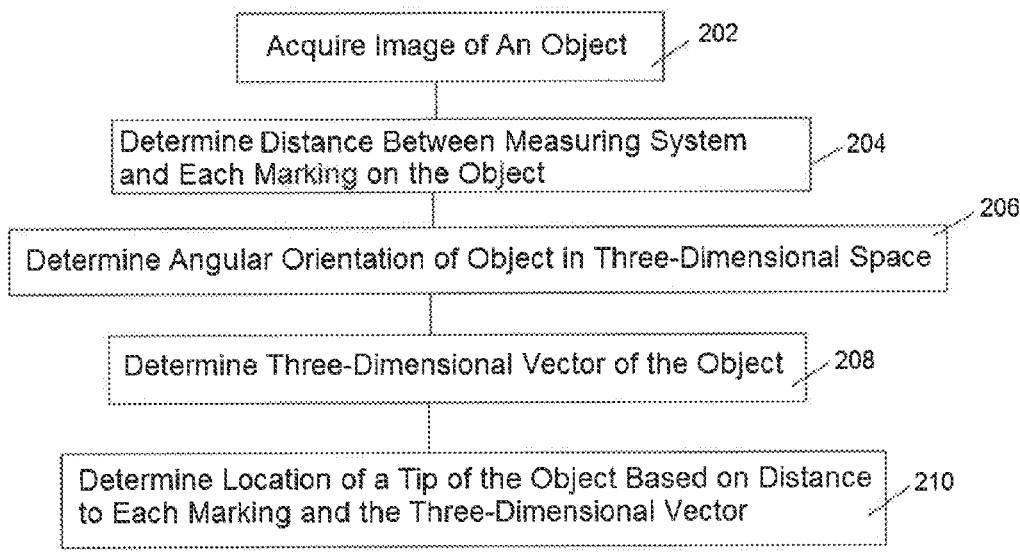
FIG. 2 illustrates a flowchart showing a method according to an embodiment.

FIG. 2 illustrates a flowchart showing a measurement method 200 according to an embodiment. The steps of exemplary measurement method of FIG. 2 can be defined by the computer program instructions stored in memory 102 and/or data storage device 107 and controlled by processor 101 executing the computer program instructions. Accordingly, by executing the computer program instructions, the processor 101 executes an algorithm defined by the method steps of FIG. 2.

Measurement method 200 can be used to determine a location of object 110 using measurement system 100 of FIG. 1. At step 202, an image of object 110 is received via image acquisition module 104 of FIG. 1. In an embodiment, step 202 includes setting up and positioning measurement system 100 at known three-dimensional coordinates. The height to the intersection of the vertical and horizontal axis of measurement system 100 is measured from the known three-dimensional coordinates, along a plumb line from said coordinates to the said intersection of the vertical and horizontal axis of measurement system. A horizontal plane of measurement system 100 is oriented to a secondary known point with three-dimensional coordinates, or to a known azimuth direction. It is to be understood that the height of the measurement system can be zero.

FIG. 3 illustrates an image of object 110 in a field of view of measurement system 100 as received by image acquisition module 104.

Field of view 300 of measurement system 100 captures an image of object 110 having a tip T and three markings $R_1$, $R_2$, and $R_3$ disposed on a surface at known spacing, i.e., a distance between tip T and each marking $R_1$, $R_2$, and $R_3$ is known. For example, distance between tip T and marking $R_1$ is distance $S_1$, distance between marking $R_1$ and marking $R_2$ is distance $S_2$, distance between marking $R_2$ and marking $R_3$ is distance $S_3$. In an embodiment, distance between tip T and marking $R_2$ equals a sum of distance $S_1$ and distance $S_2$. Distance between tip T and marking $R_3$ equals a sum of distance $S_1$, distance $S_2$, and distance $S_3$.

In an embodiment, field of view 300 also includes coordinate axes where a vertical axes Y and a horizontal axes X are illustrated as a "crosshair" with a third axes (e.g., axes Z), as shown in FIG. 3A, being perpendicular to each of the vertical axes Y and the horizontal axes X.

Returning to FIG. 2, at step 204, a distance between measurement system 100 and each of markings $R_1$, $R_2$, and $R_3$ is determined. In an embodiment, at step 204, a distance between measurement system 100 and a center of object 110 (not shown) is also determined. FIG. 4 illustrates generation of an image of object 110 by measurement system 100 based on determined center of object 110. In an embodiment, measurement system 100 measures distance OD between a prism 420 and a center of object 110 based on known focal length FL between prism 420 and a focal point and based on known image distance ID between prism 420 and a generated image 430 of object 110.

Applying step 204 to FIG. 1, a determination is made of distance $D_1$ between marking $R_1$ and camera 104, distance $D_2$ between marking $R_2$ and camera 104, and distance $D_3$ between marking $R_3$ and camera 104. In an embodiment, data about time necessary for an optical signal to be reflected off each of markings $R_1$, $R_2$, and $R_3$ back to measurement system 100 is transmitted to memory 102 which is accessed by processor 101 to calculate distances $D_1$, $D_2$, and $D_3$ based on the data. In an alternative embodiment, data is transmitted from image acquisition module 104 directly to processor 101 for calculation of distances $D_1$, $D_2$, and $D_3$ and the results of the calculation is stored in memory 102.

Figure 5:
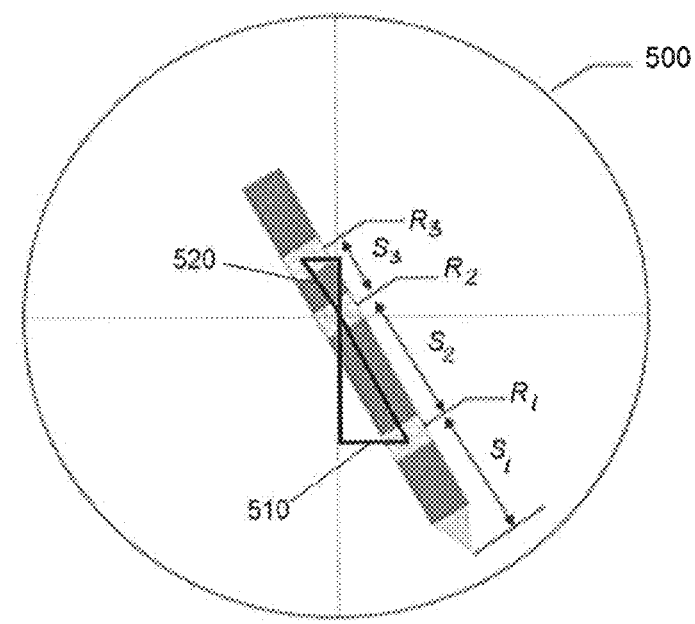
FIG. 5 illustrates graphical representation of determining horizontal and vertical angles of object 110 in three-dimensional space according to an embodiment.
Figure 6:
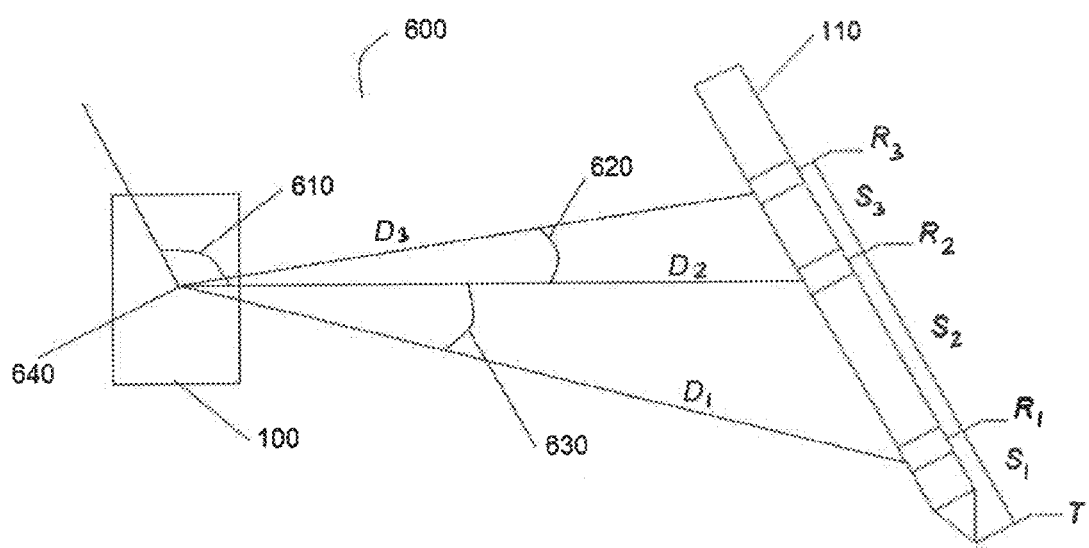
FIG. 6 illustrates a graphical representation 600 of determining slope distance according to an embodiment.

At step 206, measurement system 100 determines angular orientation of object 110 in three-dimensional space. For example, a determination is made of a yaw angle $\phi$ and a pitch angle $\theta$ at which object 110 is positioned in three-dimensional space. The yaw angle $\phi$ is an angular displacement of object 110 relative to axes Y. Pitch angle $\theta$ is an angular displacement of object 110 relative to axes Z (as shown in FIG. 3A). In an embodiment, determining of angular orientation of object 110 in three-dimensional space includes determining horizontal and vertical angles of object 110 with relative to measurement system 100. FIG. 5 illustrates graphical representation of determining horizontal and vertical angles of object 110 in three-dimensional space. Specifically, horizontal and vertical angles for each marking of object 110 are determined by solving triangles 510 and 520 using the distance between each markings and the observed positions of $R_1$, $R_2$, and $R_3$ from the measurement system 100. The Z coordinate for each marking $R_1$, $R_2$, and $R_3$ of object 110 is determined based on the determined vertical angles for each marking $R_1$, $R_2$, and $R_3$ and a determined slope distance from the measurement system 100 to $R_2$. FIG. 6 illustrates a graphical representation 600 of determining slope distance based on a top view of measurement system 100 and object 110. The slope distance is determined based on known three-dimensional coordinates of a center 640 of measurement system 100, known distances between markings $R_1$, $R_2$, and $R_3$, and the determined horizontal angles 620 and 630.

Returning to FIG. 2, at step 208, based on the determined distances $D_1$, $D_2$, $D_3$, yaw angle $\phi$, pitch angle $\theta$, and three-dimensional coordinates of all markings $R_1$, $R_2$, and $R_3$, measurement system 100 determines a three-dimensional vector of object 110 by determining a best-fit line for markings $R_1$, $R_2$, and $R_3$.

At step 210, based on known distances $S_1$, $S_2$, $S_3$ and based on the determined distances $D_1$, $D_2$, $D_3$, yaw angle $\phi$, pitch angle $\theta$, and the three-dimensional vector, measurement system 100 determines distance $D_T$ to tip T and a location of tip T of object 110 in a three-dimensional space. In an embodiment, in the case that object 110 is in motion, continuous determining of distances $D_1$, $D_2$, $D_3$, yaw angle $\phi$, and pitch angle $\theta$ of object 110 enables measurement system 100 to determine velocity of the object. Thus, measurement system 100 determines the instantaneous location of tip T of object 110 in a three-dimensional space and movement of object 110 in three-dimensional space with accuracy.

It is to be understood that measurement system 100 can be implemented as a part of a computing device configured to identify a location of tip T of object 110 in a three dimensional space. Alternatively, measurement system 100 can be communicatively connected to (wirelessly or via direct circuitry) and controlled by a computing device configured to identify a location of object 110 in a three dimensional space.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of operation of a measurement system for identifying a location of a moving object having a tip end and a plurality of markings disposed on an outer surface in three-dimensional space, comprising:
   acquiring an image of the moving object using a camera, the camera having a field of view that simultaneously captures both the moving object and at least three markings of the plurality of markings, each of the at least three markings having a known position on the moving object as measured from the tip end;
   determining a distance between the measurement system and each of the at least three markings of the plurality of markings;
   determining a plurality of angles at which the moving object is positioned in the three-dimensional space, the plurality of angles including at least a yaw angle and a pitch angle;
   determining a three-dimensional vector of the object using the distance between the measurement system and each of the plurality of markings and using the plurality of angles at which the moving object is positioned in the three-dimensional space; and
   determining an instantaneous position of the tip end and a velocity of the moving object in the three-dimensional space based on the known position of each of the at least three markings on the object, the distance between each of the least three markings and the measurement system, the yaw angle, the pitch angle, and and the three-dimensional vector of the moving object.

2. The method of claim 1, wherein each of the plurality of markings is a photo-reflector.

3. The method of claim 1, wherein each of the plurality of markings is an optical signal emitter.

4. The method of claim 1, wherein the plurality of markings is a combination of at least one photo-reflector and at least one optical signal emitter.

5. The method of claim 1, wherein a distance between the tip end and at least one of the plurality of markings is known.

6. The method of claim 1, wherein a distance between each of the plurality of markings is known.

7. The method of claim 1, wherein determining a plurality of angles at which the moving object is positioned in the three-dimensional space comprises:
   determining the yaw angle at which the moving object is positioned in the three-dimensional space; and
   determining the pitch angle at which the moving object is positioned in the three-dimensional space.

8. The method of claim 1, further comprising:
   displaying to a user the position of the tip end of the moving object, a value of the distance to each of the plurality of markings, and the three-dimensional vector of the moving object.

9. The method of claim 1, wherein determining the distance between the measurement system and each of the plurality of markings comprises:
   measuring a plurality of distances between the measurement system and each of the plurality of markings to determine movement of the moving object.

10. An apparatus for identifying a location of a moving object having a tip end and a plurality of markings disposed on an outer surface in three-dimensional space, the apparatus comprising:
    a camera, the camera having a field of view that simultaneously captures both the moving object and at least three markings of the plurality of markings, each of the at least three markings having a known position on the moving object as measured from the tip end;
    an input-output module;
    an antenna;
    a storage device;
    a processor; and
    a memory communicatively couple with the processor, the memory storing computer program instructions which, when executed on the processor, cause the processor to perform operations comprising:
        acquiring an image of the moving object using the camera;
        determining a distance between the measurement system and each of the at least three markings of the plurality of markings;
        determining a plurality of angles at which the moving object is positioned in the three-dimensional space, the plurality of angles including at least a yaw angle and a pitch angle;
        determining a three-dimensional vector of the moving object using the distance between the measurement system and each of the plurality of markings and using the plurality of angles at which the moving object is positioned in the three-dimensional space; and determining an instantaneous position of the tip end and a velocity of the moving object in the three-dimensional space based on the known position of each of the at least three markings on the moving object, the distance between each of the at least three markings and the measurements system, the yaw angle, the pitch angle, and the three-dimensional vector of the moving object.

11. The apparatus of claim 10, wherein the image-acquiring module comprises a Charge-Coupled Device (CCD) camera.

12. The apparatus of claim 10, wherein determining a plurality of angles at which the moving object is positioned in the three-dimensional space comprises:
   determining the yaw angle at which the moving object is positioned in the three-dimensional space; and
   determining the pitch angle at which the moving object is positioned in the three-dimensional space.

13. The apparatus of claim 10, the operations further comprising:
   displaying to a user the position of the tip end of the moving object, a value of the distance to each of the plurality of markings, and the three-dimensional vector of the moving object.

14. The apparatus of claim 10, wherein determining the distance between the measurement system and each of the plurality of markings comprises:
   measuring a plurality of distances between the measurement system and each of the plurality of markings to determine movement of the moving object.

15. A non-transitory computer-readable medium storing computer program instructions for identifying a location of a moving object having a tip end and a plurality of markings disposed on an outer surface in three-dimensional space, which, when executed on a processor, cause the processor to perform operations comprising:
   acquiring an image of the object using a camera, the camera having a field of view that simultaneously captures both the moving object and at least three markings of the plurality of markings therein, each of the at least three markings having a known position on the moving object as measured from the tip end;
   determining a distance between the measurement system and each of the at least three markings of the plurality of markings;
   determining a plurality of angles at which the moving object is positioned in the three-dimensional space, the plurality of angles including at least a yaw angle and a pitch angle;
   determining a three-dimensional vector of the moving object using the distance between the measurement system and each of the plurality of markings and using the plurality of angles at which the moving object is positioned in the three-dimensional space; and
   determining an instantaneous position of the tip end and a velocity of the moving object in the three-dimensional space based on the known position of each of the at least three markings on the object, the distance between each of the at least three markings and the measurement system, the yaw angle, the pitch angle, and the three-dimensional vector of the moving object.

16. The non-transitory computer-readable medium of claim 15, wherein determining a plurality of angles at which the moving object is positioned in the three-dimensional space comprises:
   determining the yaw angle at which the object is positioned in the three-dimensional space; and
   determining the pitch angle at which the object is positioned in the three-dimensional space.

17. The non-transitory computer-readable medium of claim 15, the operations further comprising:
   displaying to a user the position of the tip end of the object, a value of the distance to each of the plurality of markings, and the three-dimensional vector of the object.

18. The non-transitory computer-readable medium of claim 15, wherein the determining the distance between the measurement system and each of the plurality of markings comprises:
   measuring a plurality of distances between the measurement system and each of the plurality of markings to determine movement of the moving object.

19. An apparatus for identifying a location of a moving object having a tip end and a plurality of markings disposed on an outer surface in three-dimensional space, the apparatus comprising:
   means for acquiring an image of the moving object, the means for acquiring the image having a field of view that simultaneously captures both the moving object and at least three markings of the plurality of markings, each of the at least three markings having a known position on the moving object as measured from the tip end;
   means for determining a distance between the measurement system and each of the at least three markings of the plurality of markings;
   means for determining a plurality of angles at which the moving object is positioned in the three-dimensional space, the plurality of angles including at least a yaw angle and a pitch angle;
   means for determining a three-dimensional vector of the moving object using the distance between the measurement system and each of the plurality of markings and using the plurality of angles at which the moving object is positioned in the three-dimensional space; and
   means for determining an instantaneous position of the tip end and the velocity of the moving object in the three-dimensional space based on the known position of each of the at least three markings on the object, the distance between each of the at least three markings and the measurement system, the yaw angle, the pitch angle, and the three-dimensional vector of the moving object.

20. The apparatus of claim 19, the apparatus further comprising:
   means for displaying to a user the position of the tip end of the moving object, a value of the distance to each of the plurality of markings, and the three-dimensional vector of the moving object.

* * * * *